US011862767B2

(12) United States Patent
Brenner et al.

(10) Patent No.: US 11,862,767 B2
(45) Date of Patent: *Jan. 2, 2024

(54) ENERGY STORAGE MODULE AND METHOD FOR PRODUCTION THEREOF

(71) Applicant: CLARIOS ADVANCED SOLUTIONS GMBH, Hannover (DE)

(72) Inventors: Helge Brenner, Hannover (DE); Ralf Joswig, Buchholz (DE); Markus Hoh, Wunstorf (DE)

(73) Assignee: CLARIOS ADVANCED SOLUTIONS GMBH, Hannover (DE)

( * ) Notice: Subject to any disclaimer, the term of this patent is extended or adjusted under 35 U.S.C. 154(b) by 260 days.

This patent is subject to a terminal disclaimer.

(21) Appl. No.: 17/382,993

(22) Filed: Jul. 22, 2021

(65) Prior Publication Data

US 2021/0351467 A1 Nov. 11, 2021

Related U.S. Application Data

(63) Continuation of application No. 16/332,731, filed as application No. PCT/EP2017/075123 on Oct. 4, 2017, now Pat. No. 11,088,413.

(30) Foreign Application Priority Data

Oct. 4, 2016 (DE) .......................... 102016118752.6

(51) Int. Cl.
*H01M 10/0587* (2010.01)
*H01M 10/48* (2006.01)
(Continued)

(52) U.S. Cl.
CPC ... *H01M 10/0587* (2013.01); *H01M 10/0525* (2013.01); *H01M 10/48* (2013.01);
(Continued)

(58) Field of Classification Search
None
See application file for complete search history.

(56) References Cited

U.S. PATENT DOCUMENTS 6,399,241 B1 6/2002 Hara et al.
6,538,415 B1 3/2003 Fang et al.
(Continued)

FOREIGN PATENT DOCUMENTS

CN 1170970 A * 1/1998 .......... H01M 10/488
CN 1197190 C1 4/2005
(Continued)

*Primary Examiner* — Carlos Barcena
(74) *Attorney, Agent, or Firm* — Christopher & Weisberg, P.A.

(57) ABSTRACT

The invention relates to an energy storage module. The energy storage module includes a plurality of energy storage cells, where each of the plurality of energy storage cells is connected electrically. The energy storage module further includes a housing having a portion that receives the plurality of energy storage cells, a measurement line integrated into the housing, and a barrier layer arranged between the housing and the plurality of energy storage cells. The barrier layer is at least in the portion of the housing and is impermeable to gases and liquids. An energy storage system and a method for continuously producing energy storage modules are also described.

20 Claims, 3 Drawing Sheets

(51) Int. Cl.
*H01M 10/0525* (2010.01)
*H01M 50/20* (2021.01)
*H01M 50/24* (2021.01)
*H01M 50/30* (2021.01)
*H01M 50/60* (2021.01)
*H01M 50/502* (2021.01)
*H01M 50/211* (2021.01)
*H01M 50/227* (2021.01)
*H01M 50/524* (2021.01)
*H01M 50/569* (2021.01)
*H01M 50/516* (2021.01)
*H01M 10/04* (2006.01)
*H01M 10/052* (2010.01)

(52) U.S. Cl.
CPC ....... *H01M 10/482* (2013.01); *H01M 50/211* (2021.01); *H01M 50/227* (2021.01); *H01M 50/24* (2021.01); *H01M 50/30* (2021.01); *H01M 50/516* (2021.01); *H01M 50/524* (2021.01); *H01M 50/569* (2021.01); *H01M 10/0404* (2013.01); *H01M 10/0431* (2013.01); *H01M 10/052* (2013.01); *H01M 2220/20* (2013.01); *Y02E 60/10* (2013.01)

(56) References Cited

U.S. PATENT DOCUMENTS

| | | | |
|---|---|---|---|
| 6,755,873 | B2 | 6/2004 | Mizutani et al. |
| 2014/0162114 | A1 | 6/2014 | Suzuki |
| 2015/0064521 | A1 | 3/2015 | Watanabe et al. |
| 2015/0295284 | A1* | 10/2015 | Kohlberger ......... H01M 50/569 324/426 |
| 2015/0380697 | A1 | 12/2015 | Osborne et al. |
| 2016/0049706 | A1* | 2/2016 | Kerspe ............. H01M 10/6555 429/120 |
| 2016/0248052 | A1 | 8/2016 | Minamitani |
| 2016/0336562 | A1 | 11/2016 | Oh et al. |

FOREIGN PATENT DOCUMENTS

| | | |
|---|---|---|
| CN | 104183863 A | 12/2014 |
| CN | 105431961 A | 3/2016 |
| CN | 105914037 A | 8/2016 |
| EP | 3121881 A1 | 1/2017 |
| JP | 2002151026 A | 5/2002 |
| JP | 2004-071302 A1 | 3/2004 |
| JP | 2004071302 A | 3/2004 |
| JP | 2006079909 A | 3/2006 |
| JP | 2016046113 A | 4/2016 |
| WO | 2015/140952 A1 | 9/2015 |

* cited by examiner

ENERGY STORAGE MODULE AND METHOD FOR PRODUCTION THEREOF

CROSS REFERENCE TO RELATED APPLICATIONS

This application is a Continuation of U.S. application Ser. No. 16/332,731, filed Oct. 4, 2017, which is a Submission under 35 U.S.C. § 371 for U.S. National Stage Patent Application of International Application No. PCT/EP2017/075123 entitled "ENERGY STORAGE MODULE AND METHOD FOR PRODUCTION THEREOF," filed on Oct. 4, 2017, which claims priority to and the benefit of Application No. DE 102016118752.6, filed Oct. 4, 2016, all of which are hereby incorporated by reference in their entirety for all purposes.

DESCRIPTION

The present application relates to an energy storage module, which is produced by means of a continuous production method, and to a method for production thereof.

In the production of energy storage modules, the usual practice is for a multiplicity of energy storage cells to be produced first of all. For this purpose, a multiplicity of electrodes and separators is arranged within a cell housing and closed. The individual energy storage cells must then be arranged in a module housing and connected electrically. This is conventionally accomplished by means of a busbar, which must be connected in an electrically conductive manner to the individual cells, in particular by welding. Only then can the energy storage module be closed and, for example, built into an energy storage system.

However, such a production method has the disadvantage that the large number of mutually independent production steps make it both time-consuming and also expensive. This furthermore increases the costs for the production method, just as it increases the costs for the energy storage system and the energy storage module.

It is therefore the underlying object of the invention to provide an improved, powerful and space-saving energy storage module which does not have the disadvantages of the prior art and can be produced in a simple and low-cost manner.

Regarding the energy storage system, the object on which the invention is based is achieved according to the invention by the subject matter of independent patent claim 1. Regarding the method for producing an energy storage module of this kind, the object on which the invention is based is achieved according to the invention by the subject matter of additional independent patent claim 16. Advantageous developments are specified in the dependent claims.

According to the invention, an energy storage module which is produced by a continuous production method is therefore specified. In this case, the energy storage module has a multiplicity of energy storage cells, connected electrically in series, and a housing, produced from plastic, at least in some region or regions and preferably completely. The multiplicity of energy storage cells can be received or is received in the housing. A barrier layer is arranged between the housing and the multiplicity of energy storage cells, at least in some region or regions, preferably completely.

The barrier layer means a layer which prevents gases and/or liquids being able to enter the housing or leave the housing. In this context, the barrier layer can be formed from metal, metal oxide and/or silicates. A barrier layer made from a light metal, in particular aluminum and/or an aluminum alloy, is preferably used.

The advantages of the invention are obvious. An energy storage module of this kind according to the invention first of all has the advantage that various functionalities are integrated into the energy storage module and, as a result, both product costs and production costs can be lowered. This is furthermore promoted by the simple and quick production method. Through the use of a continuous production method, it is possible to produce a large number of energy storage modules within a short time, which involves less effort and, at the same time, is less cost-intensive in comparison with discontinuous production. It is furthermore advantageously possible to use low-cost and easily formed materials, in particular plastics, for the housing. For example, an acrylonitrile butadiene styrene, a polycarbonate, a polyamide, polyvinyl chloride, polyethylene terephthalate, polyoxymethylene, a polyolefin or a copolymer thereof can be selected, preferably a polyolefin copolymer such as a polypropylene-polyethylene copolymer. At the same time, the housing is advantageously nevertheless impermeable to gases and/or liquids by virtue of the barrier layer.

According to another aspect of the invention, the housing can have an upper housing shell and a lower housing shell. This furthermore simplifies the production of the energy storage module since the housing is, on the one hand, simpler to produce and, on the other hand, simpler to arrange. It is thereby possible to further lower product costs and production costs.

According to another aspect of the invention, the housing can hermetically enclose the multiplicity of energy storage cells. This advantageously increases the safety of the energy storage module since a risk of explosion and fire, which can be caused by the entry of moisture into the energy storage module, can advantageously be prevented by hermetic sealing of the energy storage module with respect to the environment.

According to another aspect of the invention, the housing can be pre-shaped, in particular pre-shaped plastically, more specifically in such a way that the housing has a multiplicity of recesses, which are each designed to receive one energy storage cell. In particular, the housing is thermoformed. This advantageously leads to simpler production since the energy storage cells can automatically be arranged correctly with the aid of the recesses. A further positioning and alignment step is thereby eliminated. The housing can furthermore be pre-shaped by means of low-cost production methods, this once again leading to a reduction in product and production costs.

According to another aspect of the invention, each energy storage cell can have, on each of two opposing sides, a connecting element, by means of which adjacently arranged energy storage cells are connected or can be connected to one another. In particular, the connecting element can be a flexible and/or bendable connecting element. Adjacently arranged energy storage cells can preferably be welded to one another by means of the connecting elements thereof, more specifically in such a way that a flexible and/or bendable connection point is formed. As a result, the electric contacting of adjacently arranged energy storage cells, in particular the connection of the energy storage cells in series, is advantageously simplified. This leads to simpler production of the energy storage module, this being associated, in turn, with a reduction in costs.

According to another aspect of the invention, the housing and the multiplicity of energy storage cells can form a cell stack, more specifically by virtue of the fact that the connecting elements are each bent in such a way that two adjacent cells are arranged one above the other. This means that the multiplicity of energy storage cells, which was previously arranged at least substantially horizontally adjacent to one another, forms a cell stack, in which the multiplicity of energy storage cells is now stacked at least substantially vertically one above the other, wherein energy storage cells which are directly one above the other continue to be connected by the now bent connecting elements.

This advantageously has the effect that the energy storage cells of the energy storage module are arranged in a space-saving manner and, as a result, particularly the overall size of the energy storage module and hence also of an energy storage system which has at least one energy storage module can be kept as small as possible at the same time.

According to another aspect of the invention, the energy storage module can furthermore have at least one plastic film, which is provided between the housing and the energy storage cells, at least in some region or regions, preferably in each case between the lower and the upper housing shell and the multiplicity of energy storage cells. This has the advantage that the energy storage cells can furthermore be protected from environmental influences with the aid of the plastic film. In this case, the plastic film can be produced from low-cost plastic that is easy to process, e.g. polyamide, polyethylene terephthalate, polypropylene and/or polyethylene. The use of a plastic furthermore also ensures that the weight of the energy storage module is advantageously not driven higher. It furthermore remains inexpensive and simple to produce.

According to another aspect of the invention, the plastic film can have apertures, more specifically at the points at which the connecting elements are arranged. This advantageously offers a simple way of forming contact points with, for example, a measurement line and of providing access to the connecting elements for any further processing steps, e.g. connection of two directly adjacent energy storage cells by means of the connecting elements thereof.

According to another aspect of the invention, the plastic film can be pre-shaped, in particular pre-shaped plastically, preferably thermoformed, more specifically in such a way that the film has a multiplicity of recesses, which are each designed to receive one energy storage cell. This advantageously allows simple arrangement and alignment both of the energy storage cells in the film and the film in the housing or the upper and lower housing shell. This is also associated with simple production, which can also lead to a reduction in method costs.

According to another aspect of the invention, the energy storage cells can be designed as jelly rolls. In this context, jelly roll cells provide advantageous, space-saving and weight-saving energy storage cells, which nevertheless have a relatively high power density.

According to another aspect of the invention, the energy storage cells can be lithium-ion cells. Lithium-ion cells can advantageously have a relatively high power density.

According to another aspect of the invention, the energy storage module can have a measurement line, which is preferably integrated into the housing or into the plastic film. By means of such a measurement line the energy storage module can be monitored in an advantageously simple manner, which can lead to an increase in the safety and performance of the energy storage module or to assessment of the performance of the energy storage module.

According to another aspect of the invention, the measurement line can determine a state, in particular a voltage and/or a current flow and/or a capacity, of an energy storage cell of a plurality of energy storage cells and/or of all the multiplicity of energy storage cells. Here, the most important parameters by means of which the states of the energy storage module can be inferred can advantageously be monitored. The functioning capacity of the energy storage module can thereby be continuously monitored and ensured.

According to another aspect of the invention, each energy storage cell can have at least one filling hole and/or venting hole. In particular, the at least one filling and/or venting hole can be of reclosable or hermetically reclosable design. This advantageously simplifies the handling of a storage cell.

According to another aspect of the invention, energy storage systems, in particular for use in a vehicle, are specified. Here, the energy storage system has at least one energy storage module described above and a system housing, wherein the at least one energy storage module is arranged within the system housing. In this case, an energy system which is simple and inexpensive to produce is advantageously specified.

With regard to the method for producing an energy storage module, in particular a storage module described above, the method involved here is, according to the invention, a continuous production method. This offers the advantage that the energy storage module or a multiplicity of energy storage modules can be produced quickly and inexpensively. Moreover, this involves less effort than a discontinuous production method. It is furthermore advantageously possible to use low-cost and easily formed materials, in particular plastics, for the housing. An acrylonitrile butadiene styrene, a polycarbonate, a polyamide, polyvinyl chloride, polyethylene terephthalate, polyoxymethylene, a polyolefin or a copolymer thereof can be chosen, for example.

According to another aspect of the invention, the method can furthermore have the following steps, namely supplying a lower housing shell made from plastic as an endless strip, arranging a multiplicity of energy storage cells in each case by means of a first surface of the energy storage cells on the lower housing shell and supplying an upper housing shell made from plastic as an endless strip, more specifically on a second surface of the energy storage cells, which lies opposite the first surface. In this case, a barrier layer is arranged between the lower and upper housing shells and each of a multiplicity of energy storage cells. This advantageously shortens the duration of the method and hence the production costs. At the same time, the housing is advantageously nevertheless impermeable to gases and/or liquids by virtue of the barrier layer.

According to another aspect of the invention, the method can furthermore have the following steps, namely supplying and thermoforming in each case at least one plastic film, more specifically in such a way that a multiplicity of recesses is formed, wherein each recess is designed to receive one energy storage cell. In this case, a plastic film is provided between the lower and upper housing shells and each of the multiplicity of energy storage cells. In particular, a plastic film is provided between the barrier layer and each of the multiplicity of energy storage cells.

This has the advantage that the energy storage cells can furthermore be protected from environmental influences with the aid of the plastic film. In this case, the plastic film can be produced from low-cost plastic that is easy to process, e.g. polyamide, polyethylene terephthalate, polypropylene and/or polyethylene. The use of a plastic furthermore also ensures that the weight of the energy storage module is advantageously not driven higher. It furthermore remains inexpensive and simple to produce.

According to another aspect of the invention, directly adjacent energy storage cells can be connected to one another by connecting elements, which are each arranged on two opposing sides of each energy storage cell, more specifically in such a way that the energy storage cells are connected electrically in series. In particular, directly adjacent energy storage cells can be connected by welding the connecting elements of these energy storage cells. In particular, the connecting element can be a flexible and/or bendable connecting element. Adjacently arranged energy storage cells can preferably be welded to one another by means of the connecting elements thereof, more specifically in such a way that a flexible and/or bendable connection point is formed. This offers the advantage that the electric contacting of adjacently arranged energy storage cells, in particular the connection of the energy storage cells in series, can thereby be simplified. This leads to simpler production of the energy storage module, this being associated, in turn, with a reduction in costs.

According to another aspect of the invention, a predetermined or predeterminable number of connected cells is cut off, wherein at least the housing and the multiplicity of energy storage cells form a cell stack, more specifically in such a way that in each case two directly adjacent energy storage cells are bent in such a way by means of the associated connecting elements that they are arranged one above the other, in particular in such a way that a serpentine bending line is formed. This offers the advantage that the energy storage cells of the energy storage module can be arranged in a space-saving manner and, as a result, particularly the overall size of the energy storage module and hence also of an energy storage system which has at least one energy storage module can be kept as small as possible at the same time.

The invention is described in detail below, including regarding further features and advantages, using the description of embodiments with reference to the accompanying drawings.

Figure 1:
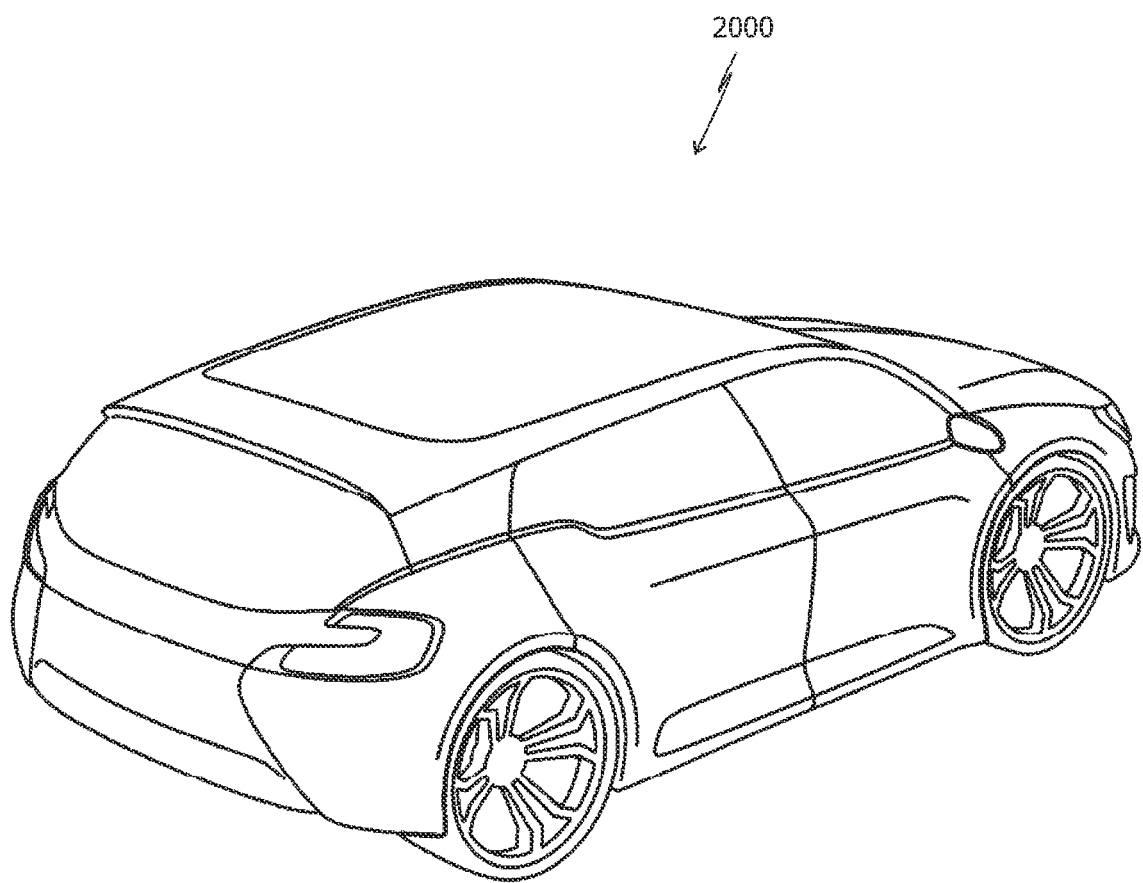
FIG. 1 shows a schematic representation of a vehicle.

The energy storage module according to the invention and method according to the invention for producing an energy storage module of this kind are described in greater detail below with reference to the illustrations in FIGS. 1 through 5. Identical or equivalent elements and functions are provided with the same or similar reference characters.

With the continuously increasing number of electric energy consuming units and the development of vehicles 2000 in the direction of electric vehicles and/or hybrid vehicles, there is an increasing demand for energy storage systems with a relatively high power density which can furthermore be produced quickly and at low cost. However, it is furthermore equally conceivable to use the energy storage module 100 according to the invention in sectors in which a relatively high power density of the energy storage module 100 and of the energy storage system 1000, combined with a small installation volume and low prices, is required.

In the text which follows, "side-by-side" means at least substantially in a horizontal direction and "one above the other" means at least substantially in a vertical direction.

FIG. 1 shows a schematic representation of a vehicle 2000, which has at least one energy storage system 1000. The energy storage system 1000 furthermore has at least one energy storage module 100 according to the invention with a multiplicity of energy storage cells 10. In this case, the energy storage system 1000 can be arranged in a region of the vehicle 2000 which is at the front in the direction of travel, in a rear region of the vehicle 2000 and/or in a region underneath the seats, in particular underneath the driver's seat.

The vehicle 2000 can be an aircraft or a watercraft, a rail vehicle, an all-terrain vehicle, or preferably a road vehicle, wherein a road vehicle can mean a passenger vehicle, a truck, a bus, or a motor home.

The vehicle 2000 is driven by a drive unit. The drive unit can comprise an internal combustion engine, an electric motor or a combination thereof. A vehicle 2000 which is driven exclusively by an electric motor is referred to as an electric vehicle. A vehicle 2000 which has both an electric motor and an internal combustion engine is referred to as a hybrid vehicle. Hybrid vehicles can furthermore be subdivided into microhybrid vehicles, mild hybrid vehicles, full hybrid vehicles and/or plug-in hybrid vehicles. Here, plug-in hybrid vehicles can be taken to mean any hybrid vehicle which is not only charged by means of the internal combustion engine but can likewise be charged by means of the power grid. Full hybrid vehicles means vehicles which can be driven exclusively by means of the electric motor. Microhybrid vehicles have a start-stop functionality and preferably also have a stop-in-motion functionality. Moreover, microhybrid vehicles can charge the energy storage system 1000 by "brake energy recovery". Mild hybrid vehicles can furthermore have a boost function, which is used to assist the internal combustion engine to increase power.

Figure 2:
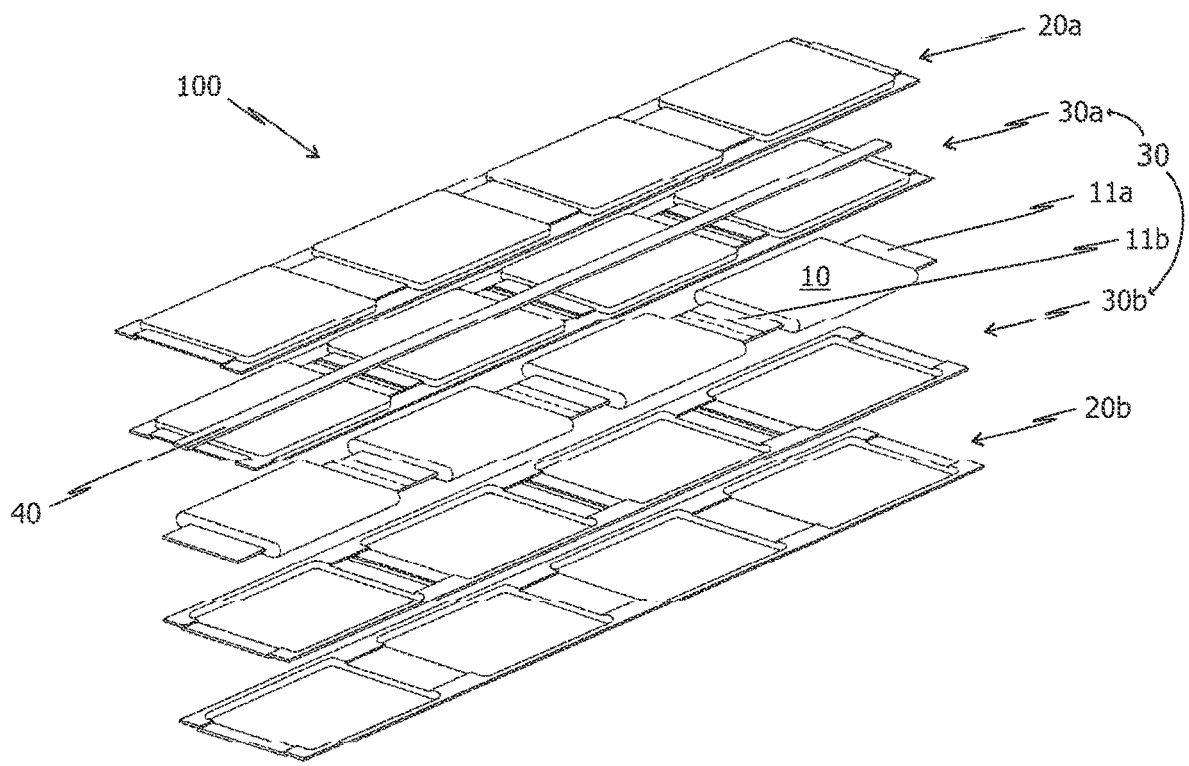
FIG. 2 shows a schematic representation of an energy storage module according to the present invention.

FIG. 2 shows a schematic exploded representation of an energy storage module 100 according to the present invention. Accordingly, the energy storage module 100 has a multiplicity of energy storage cells 10, which are connected electrically in series. Furthermore, the energy storage module 100 has a housing 20 which is produced from plastic, at least in some region or regions, preferably completely. A barrier layer is furthermore provided between the housing 20 and the multiplicity of energy storage cells 10, at least in some region or regions, in particularly completely.

In the course of this application, the barrier layer means a layer which prevents gases and/or liquids from being able to enter the housing 20 of the energy storage module 100 from the environment or prevents gases and/or liquids from being able to escape from the housing 20 into the environment. In particular, the "barrier layer" means a layer which is impermeable to gases in the ambient air, to gases which are formed during the operation of the energy storage module 100 and to liquid in the environment.

In this context, the barrier layer can be constructed from metal, metal oxide and/or silicates. A barrier layer made from ethylene-vinyl alcohol copolymer is also conceivable. Active barrier layers can furthermore also be used. These are taken to mean barrier layers which can (chemically) bind the gases and/or liquids. The metal can be or comprise a light metal, in particular aluminum and/or an aluminum alloy or magnesium and/or a magnesium alloy. In particular, any layer which prevents the passage of gas and liquid through the plastic without changing the electrochemical properties of the cell is suitable as a barrier layer.

The barrier layer can be connected materially, at least in some region or regions, to inner surfaces of the housing, in particular to inner surfaces of the lower housing shell 20b and of the upper housing shell 20a, it being possible, in particular, for the barrier layer to be vapor-deposited on the inner surfaces of the housing 20. This is preferably accomplished by chemical vapor deposition or physical vapor deposition.

It is likewise possible for the barrier layer to be formed, at least in some region or regions, in particular completely, as a foil which is connected to the inner surfaces of the housing, in particular of the lower housing shell 20b and the upper housing shell 20a. This is preferably a metal foil, which is connected materially to the inner surfaces of the housing 20.

FIG. 2 furthermore indicates that each energy storage cell 10 can have a connecting element 11a, 11b on each of two opposing sides. In this case, a first connecting element 11a can correspond to a positive contact of the energy storage cell 10 and a second connecting element 11b can correspond to a negative contact of the energy storage cell 10.

Furthermore, the connecting elements 11a, 11b can be formed from a metal foil, in particular a copper foil or an aluminum foil Moreover, two directly adjacent energy storage cells 10 can each be connected to one another by a connecting element 11a, 11b of these energy storage cells 10. The connection between two directly adjacent energy storage cells 10 is preferably accomplished by welding in each case one connecting element 11a, 11b of the energy storage cells 10 to be connected. In this case, the connecting elements 11a, 11b of the two directly adjacent energy storage cells 10 form a region of overlap, in which welding takes place. At the same time, it should be noted that the connection between two directly adjacent energy storage cells 10 is performed in each case by means of a connecting element 11a, 11b of the energy storage cells 10 in such a way that a flexible and/or bendable connection point is formed.

Connecting a multiplicity of energy storage cells 10 by means of the connecting elements 11a, 11b thereof advantageously eliminates the need to provide a busbar.

Furthermore, at least one plastic film 30 can be provided. Here, the plastic film 30 is arranged between the multiplicity of energy storage cells 10 and the housing 20 or the lower housing shell 20b and the upper housing shell 20a. The plastic film 30 can furthermore be pre-shaped, in particular pre-shaped plastically and preferably thermoformed, more specifically in such a way that the plastic film 30 has a multiplicity of recesses, which are each designed to receive one energy storage cell 10. A lower plastic film 30b, which is arranged between the lower housing shell 20b and the multiplicity of energy storage cells 10, and an upper plastic film 30a, which is arranged between the upper housing shell 20a and the multiplicity of energy storage systems 1000, are preferably provided. Here, the at least one film 30 can be produced, for example, from acrylonitrile butadiene styrene, a polycarbonate, a polyamide, polyvinyl chloride, polyethylene terephthalate, polyoxymethylene, a polyolefin, e.g. polypropylene and/or polyethylene, or a copolymer thereof.

In regions in which the connecting elements 11a, 11b of the energy cells 10 are arranged, the at least one plastic film 30 can furthermore have apertures. These apertures are used, on the one hand, to enable further production steps, e.g. the connection of two directly adjacent energy storage cells 10 by means of the connecting elements 11a, 11b thereof, to be carried out more easily and, on the other hand, to enable the monitoring of the individual cells to be simplified by contacting the connecting elements 11a, 11b to a measurement line 40.

A measurement line 40 can furthermore be provided in an energy storage module 100. This measurement line 40 can be integrated into the plastic film 30, for example, in particular into the upper plastic film 30a, or into the housing 20, in particular into the upper housing shell 20a. In this arrangement, the measurement line 40 can determine a state of an energy storage cell 10, of a plurality of energy storage cells 10 and/or of all the multiplicity of energy storage cells 10. In particular, the measurement line 40 can determine a voltage and/or a current flow and/or a capacity thereof.

The energy storage module 100 which is shown schematically in FIG. 2 has four energy storage cells 10. However, it should be noted that the number of energy storage cells 10 of an energy storage module 100 depends on the desired power density of the energy storage module 100. Thus, an energy storage module 100 with more or fewer energy storage cells 10 can also be conceivable.

Figure 3:
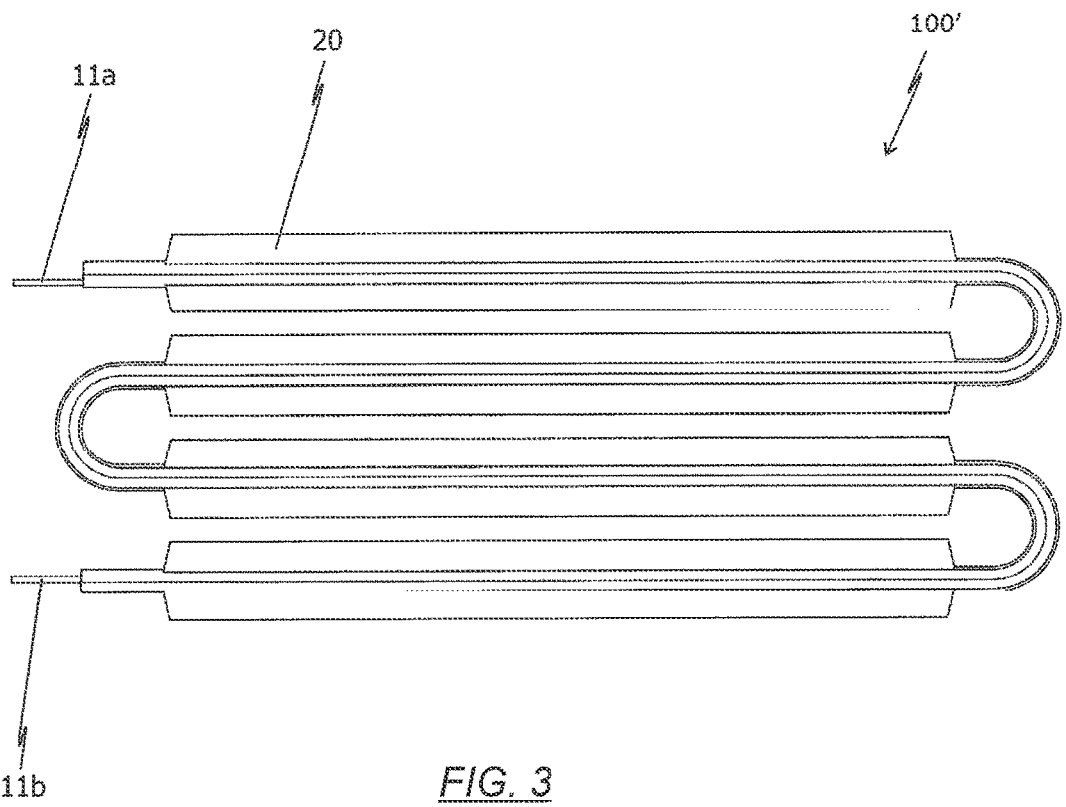
FIG. 3 shows a schematic representation of a cell stack according to the present invention.

FIG. 3 shows a schematic representation of an energy storage module 100, which is designed as a cell stack 100'. For this purpose, the energy storage module 100, which is initially aligned substantially horizontally, that is to say that the individual energy storage cells 10 are situated substantially horizontally side-by-side, is bent by way of the connecting elements 11a, 11b of the energy storage cells 10 in such a way that the energy storage cells 10 of the cell stack 100' are arranged substantially vertically one above the other. Here, the connecting elements 11a, 11b of two connected energy storage cells 10 preferably form an at least substantially 180° bend. This bend is likewise formed by the housing 20 and, where applicable, by the at least one plastic film 30, more specifically at points at which the connecting elements 11a, 11b of the energy storage cells 10 are accommodated.

Figure 4:
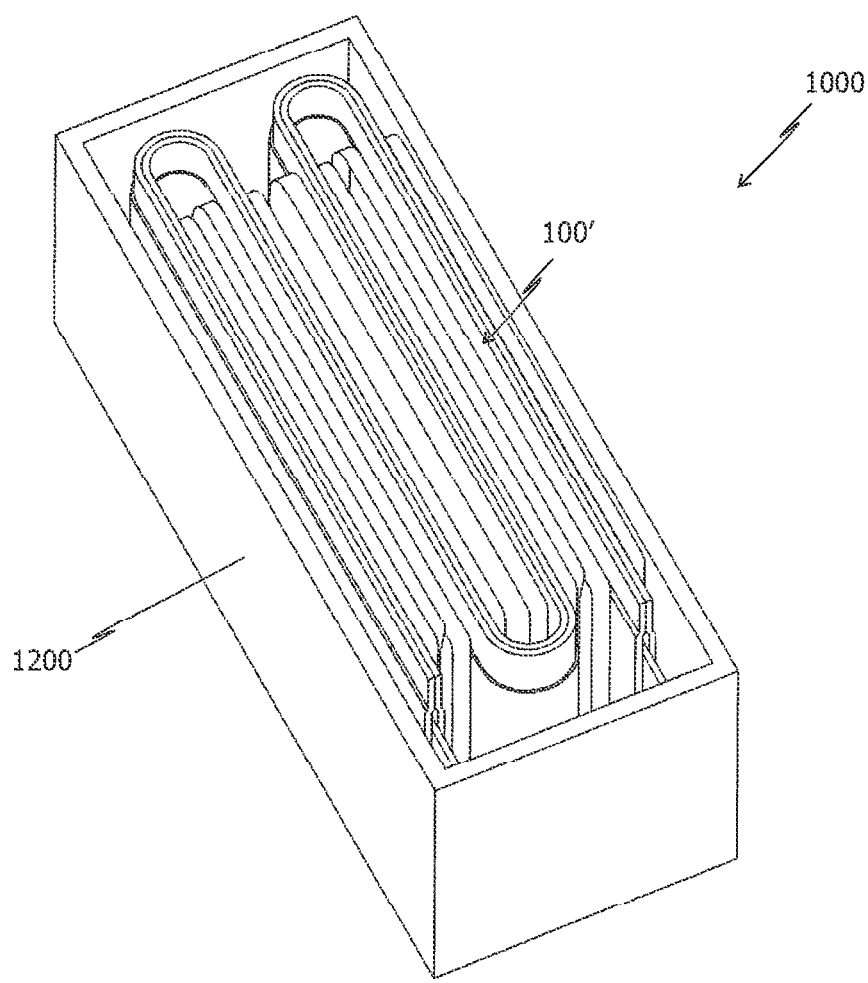
FIG. 4 shows a schematic representation of a cell stack which is arranged in a module housing.

FIG. 4 shows a schematic representation of an energy storage system 1000, which has a system housing 1200 and an energy storage module 100 formed as a cell stack 100'. For the sake of clarity, a lid has not been illustrated here. The lid, which is not illustrated, has a positive and a negative connection element, which can each be connected by means of a contacting element to a connecting element 11a, 11b of the cell stack 100'. It is furthermore conceivable for a multiplicity of energy storage modules 100 formed as a cell stack 100' to be arranged in the system housing 1200. Here, the number of energy storage modules 100 depends on the desired total capacity of the energy storage system 1000.

Even if this is not explicitly emphasized in the figures, each energy storage cell 10 can have at least one filling and/or venting hole. It is advantageous if the filling and/or venting hole is designed in such a way that it can be re-closed, preferably hermetically closed, by means of a plug. It is also conceivable to re-close the filling and/or venting hole by means of a diaphragm, which is preferably designed as a bursting diaphragm. Such a diaphragm is distinguished especially by the fact that it is impermeable to gases and/or liquids and provides protection to the extent that it bursts when an internal pressure of the energy storage cell exceeds a predetermined or predeterminable value.

Figure 5:
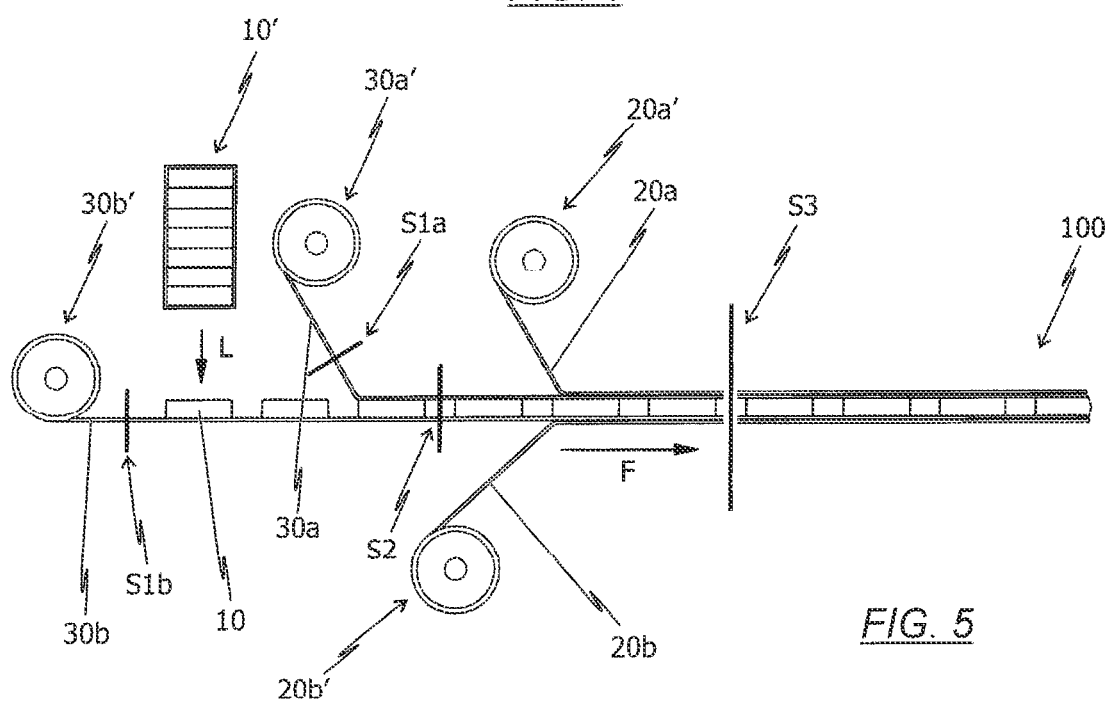
FIG. 5 shows a schematic representation of the production process of an energy storage module.

FIG. 5 shows a schematic illustration of the method for producing an energy storage module 100, which is a continuous method. Here, a magazine 10' containing a multiplicity of energy storage cells 10 is illustrated. Also illustrated is a roller 20', onto which a supply of the housing 20 is wound, in particular a roller 20b', onto which a lower housing shell 20b is wound as an endless strip, and a roller 20a', onto which an upper housing shell 20a is wound as an endless strip. The housing 20 or the lower housing shell 20b and the upper housing shell 20a is/are preferably already pre-shaped, more specifically in such a way that the housing 20 or the lower housing shell 20b and the upper housing shell 20a has/have a multiplicity of recesses, each of which is designed to receive an energy storage cell 10. As a particular preference, a barrier layer is arranged on the housing 20 or on the lower housing shell 20b or the upper housing shell 20a, namely on a surface of the housing or of the lower housing shell 20b or of the upper housing shell 20a, more specifically in the direction of the multiplicity of energy storage cells 10. Here, the production direction is indicated by the arrow F.

Here, the barrier layer prevents gases and/or liquids from being able to penetrate into the energy storage module 100 via the housing 20 and prevents gases and/or liquids from emerging via the housing 20.

In this context, the barrier layer can be constructed from metal, metal oxide and/or silicates. A barrier layer made from ethylene-vinyl alcohol copolymer is also conceivable. Active barrier layers can furthermore also be used. These are taken to mean barrier layers which can (chemically) bind the gases and/or liquids. The metal can be or comprise a light metal, in particular aluminum and/or an aluminum alloy or magnesium and/or a magnesium alloy.

The barrier layer can be connected materially, at least in some region or regions, to inner surfaces of the housing, in particular to inner surfaces of the lower housing shell 20b and of the upper housing shell 20a, it being possible, in particular, for the inner surfaces of the housing 20 to be damped. This is preferably accomplished by chemical vapor deposition or physical vapor deposition.

It is likewise possible for the barrier layer to be formed, at least in some region or regions, in particular completely, as a foil which is connected to the inner surfaces of the housing, in particular of the lower housing shell 20b and the upper housing shell 20a. This is preferably a metal foil, which is connected materially to the inner surfaces of the housing 20.

Furthermore, at least one roller 30' can be provided with a supply of plastic film as an endless strip. First of all, the lower plastic film 30b is unrolled from the roller 30b' carrying the lower plastic film 30b and is pre-shaped in a first step (S1b). The pre-shaping of the lower plastic film 30b is, in particular, plastic pre-shaping, with the pre-shaping preferably being accomplished by means of a thermoforming step. During this process, the lower plastic film 30b is pre-shaped in such a way that a multiplicity of recesses is introduced.

One energy storage cell 10 in each case is then supplied from the magazine 10' of energy storage cells 10 in a feed direction L in such a way that one energy storage cell 10 is arranged in each recess of the lower plastic film 30b. Here, the feed direction of the energy storage cells 10 is indicated by the arrow L.

An upper plastic film 30a is then supplied from a roller 30a' containing a supply of film and is pre-shaped (S1a) in a manner corresponding to the lower plastic film 30b.

The pre-shaped film 30a can then be arranged on the multiplicity of energy storage cells 10 in such a way that one energy storage cell 10 is arranged in each recess of the upper plastic film 30a. Connecting elements 11a, 11b of two directly adjacent energy storage cells 10 are then connected to one another (S2) through apertures in the upper and lower plastic film 30a, 30b. This is preferably accomplished by means of a welding process. Care should be taken here to ensure that a flexible and/or bendable connection point is formed.

The lower housing shell 20b is then supplied as an endless strip from the roller 20b' containing the lower housing shell supply and, at the same time, the upper housing shell 20a is also supplied as an endless strip from the roller 20a' containing the upper housing shell supply, more specifically in such a way that the lower housing shell 20b and the upper housing shell 20a surround the lower plastic film 30b and the upper plastic film 30a as well as the multiplicity of energy storage cells 10. As a particular preference in this case, a barrier layer is already provided on the lower or upper housing shell 20a, 20b, and this barrier layer is also already pre-shaped. The upper and the lower housing shell 20a, 20b are fed in in such a way that recesses in the lower and the upper housing shell 20a, 20b receive the recesses in the lower and the upper plastic film 30a, 30b and the energy storage cells 10.

In a further step, the endless arrangement of energy storage cells 10 with the housing 20 and the at least one plastic film 30 is cut into individual energy storage modules 100 comprising a predetermined or predeterminable number of energy storage cells 10 by means of a cutting operation.

In a further step, an energy storage module 100 can be bent. This is performed in such a way that an energy storage module 100 which was previously arranged substantially horizontally is bent in such a way that a cell stack 100' is formed, in which the energy storage cells 10 are stacked substantially vertically one above the other.

However, it is equally conceivable that the multiplicity of energy storage cells 10 is not arranged on a plastic film 30 but directly in the housing. For this purpose, the individual energy storage cells 10 are each formed with a cell housing. In this case, the energy storage cells 10 from the magazine are first of all placed on a conveyor belt and, on the latter, are connected to one another by means of the connecting elements 11a, 11b of two adjacent energy storage cells 10. The connected energy storage cells 10 are then arranged in the housing 20 or in the lower housing shell 20b and the upper housing shell 20a and subsequently divided into energy storage modules 100 by means of a cutting operation.

Even if this is not illustrated explicitly in the figures, a measurement line 40 can be integrated into the upper or into the lower plastic film 30a, 30b, for example. Such a measurement line 40 can likewise be integrated into the upper or into the lower housing shell 20a, 20b.

At this point it should be noted that all the parts described above, viewed on their own or in any combination, in particular the details shown in the drawings, are claimed as essential to the invention. Amendments thereof are familiar to the person skilled in the art.

REFERENCE CHARACTER LIST 10 energy storage cell
10' energy storage cell magazine
11a, 11b connecting element
20 housing
20a, 20b lower/upper housing shell
20a', 20b' roller containing housing supply for lower/upper housing shell
30 at least one plastic film
30a, 30b lower/upper plastic film
30a', 30b' lower/upper supply of film
40 measurement line
100 energy storage module 100' cell stack
1000 energy storage system
1200 system housing
2000 vehicle
L feed direction of the energy storage cells
F production direction
S1 thermoforming step
S2 joining step
S3 cutting step

The invention claimed is:

1. An energy storage module, the energy storage module comprising:
  a plurality of energy storage cells, each of the plurality of energy storage cells being connected electrically;
  a housing having a portion, the housing receiving the plurality of energy storage cells;
  a measurement line integrated into the housing; and
  a barrier layer arranged between the housing and the plurality of energy storage cells, the barrier layer being at least in the portion of the housing, the barrier layer being impermeable to gases and liquids.

2. The energy storage module of claim 1, wherein the measurement line determines a state, the state being at least one of a voltage, a current flow, a capacity of an energy storage cell of a plurality of energy storage cells, and a capacity of the plurality of energy storage cells.

3. The energy storage module of claim 1, wherein the housing further has an upper housing shell and a lower housing shell.

4. The energy storage module of claim 3, wherein the energy storage module further includes at least one plastic film positioned between the lower and the upper housing shell and the plurality of energy storage cells, the at least one plastic film being thermoformed and having a plurality of recesses, each recess of the plurality of recesses being configured to receive one energy storage cell.

5. The energy storage module of claim 4, wherein the measurement line is further integrated into the at least one plastic film.

6. The energy storage module of claim 1, wherein the housing hermetically encloses the plurality of energy storage cells.

7. The energy storage module of claim 1, wherein the housing is thermoformed, the housing having a plurality of recesses, each recess of the plurality of recesses configured to receive one energy storage cell.

8. The energy storage module of claim 1, wherein at least the housing and the plurality of energy storage cells form a cell stack.

9. The energy storage module of claim 1, wherein each of the plurality of energy storage cells are connected electrically in series.

10. The energy storage module of claim 4, wherein each of the plurality of energy storage cells have, on each of two opposing sides, a connecting element by which adjacently arranged energy storage cells are connected to one another forming a flexible connection point, the at least one plastic film having an aperture at a point at which the connecting element is arranged.

11. The energy storage module of claim 1, wherein the each of the plurality of energy storage cells are lithium-ion cells and comprise jelly rolls.

12. The energy storage module of claim 1, wherein each energy storage cell has at least one of a filling hole and a venting hole.

13. An energy storage system for use in a vehicle, the energy storage system comprising:
  an energy storage module, the energy storage module including:
    a plurality of energy storage cells, each of the plurality of energy storage cells being connected electrically;
    a housing having a portion, the housing receiving the plurality of energy storage cells;
    a measurement line integrated into the housing; and
    a barrier layer arranged between the housing and the plurality of energy storage cells, the barrier layer being at least in the portion of the housing, the barrier layer being impermeable to gases and liquids; and
  a system housing, the energy storage module being arranged within the system housing.

14. A method for continuously producing energy storage modules, the method comprising:
  supplying a lower housing shell as a lower continuous strip;
  arranging a plurality of energy storage cells by placing a first surface of the energy storage cells on the lower housing shell;
  supplying an upper housing shell as an upper continuous strip on a second surface of the energy storage cells, the second surface being opposite the first surface, the lower housing shell and the upper housing shell being comprised in a housing, the housing having a portion;
  integrating a measurement line into the housing; and
  arranging a barrier layer between the housing and the plurality of energy storage cells, the barrier layer being at least in the portion of the housing, the barrier layer being impermeable to gases and liquids.

15. The method of claim 14, wherein the measurement line determines a state, the state being at least one of a voltage, a current flow, a capacity of an energy storage cell of a plurality of energy storage cells, and a capacity of the plurality of energy storage cells.

16. The method of claim 14, wherein the method further includes supplying and thermoforming at least one plastic film including a plurality of recesses being formed, each recess being designed to receive one energy storage cell.

17. The method of claim 16, wherein the method further includes integrating the measurement line into the at least one plastic film.

18. The method of claim 14, wherein the method further includes providing a plastic film between the lower and upper housing shells and each of the plurality of energy storage cells.

19. The method of claim 14, wherein directly adjacent energy storage cells are connected to one another by connecting elements, the connecting elements being each arranged on two opposing sides of each energy storage cell, the energy storage cells being connected electrically in series by welding the connecting elements of directly adjacent energy storage cells.

20. The method of claim 19, wherein a predetermined number of connected cells is cut off, and wherein at least the housing and the plurality of energy storage cells form a cell stack, the cell stack having directly adjacent energy storage cells being bent by bending the associated connecting elements and forming a serpentine bending line.

* * * * *